United States Patent [19]

Heinsohn

[11] 4,374,273

[45] Feb. 15, 1983

[54] METHOD FOR PRODUCTION OF METHYLAMINES

[75] Inventor: George E. Heinsohn, Cecil County, Md.

[73] Assignee: E. I. Du Pont de Nemours and Company, Wilmington, Del.

[21] Appl. No.: 258,387

[22] Filed: Apr. 28, 1981

[51] Int. Cl.$^3$ .................... C07C 85/02; C07C 85/06; B01J 29/06

[52] U.S. Cl. .................... 564/479; 564/474; 252/455 R

[58] Field of Search ................ 564/479, 474

[56] References Cited

U.S. PATENT DOCUMENTS

| | | | |
|---|---|---|---|
| 3,384,667 | 5/1968 | Hamilton | 564/479 |
| 4,082,805 | 4/1978 | Kaeding | 564/474 |
| 4,191,709 | 3/1980 | Parker et al. | 564/479 |
| 4,205,012 | 5/1980 | Parker et al. | 564/479 |
| 4,254,061 | 3/1981 | Weigert | 564/479 |

FOREIGN PATENT DOCUMENTS 2013660  8/1979  United Kingdom ............... 564/479

*Primary Examiner*—John Doll

[57] ABSTRACT

In the catalytic preparation of methylamines from methanol and ammonia using an aluminosilicate catalyst, the mono-, di- and trimethylamine content of the product mixture can be varied from the equilibrium mixture ordinarily produced by using an amorphous aluminosilicate catalyst containing varying amounts of sodium, potassium, lithium, barium or strontium atoms as a result of treating an amorphous aluminosilicate with a corresponding metal hydroxide.

3 Claims, No Drawings

METHOD FOR PRODUCTION OF METHYLAMINES

TECHNICAL FIELD

This invention relates to improved catalysts for the preparation of methylamines from methanol or dimethyl ether and ammonia. It is more particularly directed to amorphous aluminosilicate catalysts which contain about 0.1–6%, by weight, of sodium, potassium, lithium, barium or strontium atoms.

BACKGROUND AND SUMMARY OF THE INVENTION

The methylamines, mono-, di- and trimethylamine, are commodities in the chemical industry, widely used as starting materials in the preparation of other chemicals.

The methylamines can be prepared by several methods. The most common of these is the continuous catalytic reaction of methanol or dimethyl ether and ammonia, using an aluminosilicate as a dehydration catalyst.

Under typical commercial operating conditions (400° C., 300 psig pressure and a nitrogen/carbon ratio of 1), that reaction produces an equilibrium mixture of about 15%, by weight of monomethylamine (MMA), about 23% of dimethylamine (DMA) and about 62% of trimethylamine (TMA). The composition of the mixture is a constant problem in that individual market demands for MMA, DMA and TMA vary greatly from one period to the next and are generally out of phase with what is produced. For example, the call for TMA is generally sluggish and production often far exceeds demand. This is ordinarily taken care of by recycling excess TMA product to the reactor to produce more MMA and DMA, each of which is more easily absorbed by the marketplace.

It has now been found that this problem can be more efficiently resolved by using as the catalyst for the methanol-ammonia reaction an amorphous aluminosilicate which contains about 0.1–6%, by weight, of sodium, potassium, lithium, barium or strontium atoms as a result of treating an aluminosilicate with a corresponding metal hydroxide. By varying the treatment conditions, as will be explained, one can direct the reaction to produce less than an equilibrium amount of TMA, thus dictating that the process produce more MMA and DMA.

DETAILED DESCRIPTION OF THE INVENTION

The catalysts of the invention are amorphous aluminosilicates which contain about 0.1–6%, by weight, of sodium, potassium, lithium, barium or strontium atoms as a result of treating an amorphous aluminosilicate with a corresponding metal hydroxide. Catalysts containing sodium atoms are preferred.

The metal content of a catalyst is determined by dissolving it in hydrofluoric acid and then analyzing the solution by atomic absorption spectroscopy.

The silica/alumina ratios of the catalysts can vary over an extremely wide range. Selection of the ratio is governed by factors which lie outside the realm of the present invention, e.g., the degree of conversion desired of the methanol-ammonia reaction. Presently, most commercial processes using that reaction employ an aluminosilicate catalyst having a silica/alumina weight ratio of about 87/13.

The catalysts of the invention can also contain other metal oxides such as magnesia, zirconia, boria and titania. The presence of these oxides may enhance the physical properties of the catalysts.

The methanol-ammonia reaction is well known and is described in detail in "Effect of Operating Variables on Methylamine Production", Richard S. Egly and Everett F. Smith, Chemical Engineering Progress, May, 1948, the text of which is incorporated into this specification to show how the reaction is run.

Amine synthesis in that reaction proceeds according to the general equations $$CH_3OH \text{ (or } CH_3OCH_3) + NH_3 \rightarrow CH_3NH_2 + H_2O$$

$$CH_3NH_2 + CH_3OH \rightarrow (CH_3)_2NH + H_2O$$

$$(CH_3)_2NH + CH_3OH \rightarrow (CH_3)_3N + H_2O$$

As already explained, under typical operating conditions, the product of the reaction is an equilibrium mixture of 15% by weight MMA, 23% DMA and 62% TMA. However, by using a catalyst of the invention, the relative proportions of amines in the product can be made to vary from this equilibrium. The more vigorous the treatment as regards time, temperature and concentration of hydroxide, the greater will be the catalyst's metal content, and the greater will be the proportion of MMA in the product, with a corresponding decrease the proportion of TMA. Thus, by varying the treatment of the aluminosilicate one can control the proportion of MMA in the product.

The catalysts of the invention can be made by first slurrying a preformed aluminosilicate[1] having the desired silica/alumina ratio in water. To this slurry is then added, with stirring, an aqueous solution of sodium-, potassium-, lithium-, barium- or strontium hydroxide. As already mentioned, the vigor of the treatment is governed by the proportions of amines desired in the product, the more vigorous treatment favoring production of MMA. Generally, the slurry is heated to within the range of 20° C. to reflux temperature and is held at that temperature, with stirring, for 20 minutes—8 hours. The aluminosilicate is then removed from the slurry by filtration, washed with water until it is free of base as determined by measuring the pH of the wash water, dried to remove adsorbed water and granulated. The catalyst is then ready for use.

[1] A preferred silica-alumina of this type is Davison Grade 970 Silica-Alumina sold by W. R. Grace Co.

Alternatively, the aluminosilicate may be formed by treating a silicate salt with an aluminum salt according to methods well known in the art. In these methods, the metal hydroxide treatment is accomplished by keeping the reaction medium at a basic pH during aluminosilicate formation.

The methanol-ammonia reaction is ordinarily run continuously in a column reactor, in the vapor phase, generally at a temperature of 350°–500° C. and a pressure of 690–3450 kPa (100–500 psig). The catalyst is packed into the reactor in the conventional way, and the premixed and preheated reactants are passed through it, preferably downwardly. Residence time of the reactants in the reactor are determined according to well-known chemical engineering principles, as are the methods of separating the methylamine products and refining them.

EXAMPLES

In these examples, all parts are by weight.

EXAMPLE 1—Best Mode

Davison Grade 970 Silica-Alumina was crushed and screened to U.S.S. +12 −20 mesh. Fifty parts of the resulting granular material were slurried in 200 parts of 1 M NaOH and held at reflux temperature for the time shown in the table below. The treated material was then collected by filtration, washed with water until it was substantially free of residual NaOH and dried overnight at 120° C. and a pressure of 13.3 kPa.

The treated aluminosilicate was packed into a 1.25 cm (outside diameter) stainless steel column reactor and methylamines synthesis was conducted continuously at 400° C., a pressure of 2070 kPa (300 psig), and with a 1:1 (molar basis) mixture of ammonia and methanol as the feedstock. Nominal contact time of reactants in the reactor was 22 seconds.

Results are shown in the following table:

|  | Alkylamine Content of Product | | |
| --- | --- | --- | --- |
| Treatment Time Minutes | Weight % MMA | Weight % DMA | Weight % TMA |
| No Treatment | 15 | 20 | 65 |
| 30 | 38 | 21 | 41 |
| 60 | 60 | 20 | 20 |
| 120 | 97 | 1 | 2 |

EXAMPLE 2

To a vessel containing 1000 parts of deionized water were added, at room temperature and with stirring, continuously over a 2.25 hour period, (A) a solution of 324 parts of sodium silicate[2] in 500 parts of water, and (B) a solution of 112.5 parts of $Al(NO_3)_2 \cdot 9H_2O$ in 500 parts of water.

[2] Sodium silicate JM, sold by E. I. du Pont de Nemours and Company.

Addition of the sodium silicate was begun first and the pH of the solution was monitored. When the pH reached 11, addition of the aluminum nitrate was begun at the same flow rate as the silicate solution. Throughout the addition period, the pH of the reaction mixture was maintained between 10 and 12 by controlling the addition rates of the basic sodium silicate solution and the acidic aluminum nitrate solution.

The amorphous aluminosilicate product was collected by filtration, washed three times with water, dried at 120° C. and tested for methylamines production as in Example 1. The product mixture consisted of 49% TMA, 21% DMA and 30% MMA.

I claim:

1. In the catalytic preparation of methylamines from methanol and ammonia using an aluminosilicate catalyst, a method for controlling the relative yields of monomethyl-, dimethyl- and trimethylamine, which method comprises using a catalyst comprising an amorphous aluminosilicate containing about 0.1–6%, by weight, of sodium, potassium, lithium, barium or strontium atoms as a result of treating an amorphous aluminosilicate with a corresponding metal hydroxide, the greater the added metal content of the catalyst, the greater the amount of monomethylamine produced.

2. The method of claim 1 in which the catalyst contains sodium atoms.

3. The method of claim 1 in which the aluminosilicate has a silica-alumina ratio of about 87/13.

* * * * *